US011287526B2

(12) United States Patent
Arrabolu et al.

(10) Patent No.: US 11,287,526 B2
(45) Date of Patent: Mar. 29, 2022

(54) LOCATING SPATIALIZED SOUNDS NODES FOR ECHOLOCATION USING UNSUPERVISED MACHINE LEARNING

(71) Applicant: Microsoft Technology Licensing, LLC, Redmond, WA (US)

(72) Inventors: Sai Sankalp Arrabolu, Kirkland, WA (US); Wilson Jacob Dreewes, Monroe, WA (US); Brandon Myles Arteaga, Seattle, WA (US); Namita Balachander, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 579 days.

(21) Appl. No.: 16/198,238

(22) Filed: Nov. 21, 2018

(65) Prior Publication Data

US 2020/0158865 A1 May 21, 2020

(51) Int. Cl.
*G01S 15/04* (2006.01)
*A63F 9/00* (2006.01)
(Continued)

(52) U.S. Cl.
CPC ............ *G01S 15/04* (2013.01); *A63F 9/0001* (2013.01); *G01S 15/88* (2013.01); *G06F 3/011* (2013.01);
(Continued)

(58) Field of Classification Search
CPC ........ G01S 15/04; G01S 15/88; A63F 9/0001; A63F 2009/0003; G06F 3/011; G09B 21/006
See application file for complete search history.

(56) References Cited

U.S. PATENT DOCUMENTS

| 4,907,136 A | * | 3/1990 | Jorgensen | ............... G01S 15/06 |
| | | | | 342/24 |
| 5,097,326 A | * | 3/1992 | Meijer | ................. G09B 21/006 |
| | | | | 348/62 |

(Continued)

FOREIGN PATENT DOCUMENTS

| EP | 3540566 A1 | * | 9/2019 | ............... G06F 3/011 |
| GB | 2569576 A | * | 6/2019 | ............... G06F 3/011 |
| WO | WO-2015011471 A2 | * | 1/2015 | ............. G01S 15/42 |

OTHER PUBLICATIONS

Auvray, Localisation and object recognition with the vOICe, Perception, vol. 36, pp. 416-430 (Year: 2007).*

(Continued)

*Primary Examiner* — Isam A Alsomiri
*Assistant Examiner* — Vikas Atmakuri
(74) *Attorney, Agent, or Firm* — Rainier Patents, P.S.

(57) ABSTRACT

Described herein is a system for generating echolocation sounds to assist a user having no sight or limited sight to navigate a three-dimensional space (e.g., physical environment, computer gaming experience, and/or virtual reality experience). Input is received from a user to generate echolocation sounds to navigate a three-dimensional space. Based at least on the received input, a digital representation of the three-dimensional space is segmented into one or more depth planes using an unsupervised machine learning algorithm. For each depth plane, object segments are determined for each object within the particular depth plane. Locations of a plurality of echo sound nodes are determined in accordance with the depth level and surface area of each object defined by the determined segments. The echolocation sounds comprising a spatialized sound from each echo sound node originating from the determined location are generated.

20 Claims, 7 Drawing Sheets

(51) Int. Cl.
*G01S 15/88* (2006.01)
*G09B 21/00* (2006.01)
*G06F 3/01* (2006.01)

(52) U.S. Cl.
CPC .... *G09B 21/006* (2013.01); *A63F 2009/0003* (2013.01)

(56) References Cited

U.S. PATENT DOCUMENTS

| | | | | |
|---|---|---|---|---|
| 5,475,651 | A * | 12/1995 | Bishop | G01S 7/539 367/124 |
| 6,671,226 | B1 * | 12/2003 | Finkel | A61H 3/061 367/116 |
| 7,598,976 | B2 * | 10/2009 | Sofer | G09B 21/006 348/62 |
| 8,068,644 | B2 * | 11/2011 | Tkacik | G09B 21/006 382/114 |
| 10,111,013 | B2 * | 10/2018 | Hu | H04R 25/407 |
| 10,321,258 | B2 * | 6/2019 | Arteaga | G01S 15/42 |
| 10,436,593 | B2 * | 10/2019 | Alataas | A61H 3/061 |
| 10,701,509 | B2 * | 6/2020 | Arteaga | G06T 19/006 |
| 2005/0208457 | A1 * | 9/2005 | Fink | G09B 21/00 434/112 |
| 2011/0216179 | A1 * | 9/2011 | Dialameh | G06K 9/00664 348/62 |
| 2012/0062357 | A1 * | 3/2012 | Slamka | G09B 21/006 340/4.11 |
| 2012/0124470 | A1 * | 5/2012 | West | G06F 3/0488 715/702 |
| 2012/0268563 | A1 * | 10/2012 | Chou | H04N 13/239 348/46 |
| 2013/0278631 | A1 * | 10/2013 | Border | G02C 5/143 345/633 |
| 2014/0184384 | A1 * | 7/2014 | Zhu | G09B 21/007 340/4.12 |
| 2015/0227778 | A1 * | 8/2015 | Cervantes | G06T 7/70 348/47 |
| 2017/0323485 | A1 | 11/2017 | Samec et al. | |
| 2018/0088900 | A1 * | 3/2018 | Glaser | H04R 3/005 |
| 2018/0284882 | A1 * | 10/2018 | Shipes | G06F 3/012 |
| 2018/0310113 | A1 * | 10/2018 | Ray | G06T 15/06 |
| 2018/0310116 | A1 * | 10/2018 | Arteaga | G06T 19/006 |
| 2018/0330521 | A1 * | 11/2018 | Samples | A63F 13/213 |
| 2019/0274001 | A1 * | 9/2019 | Arteaga | G09B 21/006 |
| 2019/0362149 | A1 * | 11/2019 | Mukhopadhyay | G06F 3/16 |
| 2019/0373391 | A1 * | 12/2019 | Han | G06F 3/011 |
| 2019/0377473 | A1 * | 12/2019 | Osman | A63F 13/213 |
| 2020/0042792 | A1 * | 2/2020 | Eronen | H04S 1/002 |
| 2020/0104522 | A1 * | 4/2020 | Collart | G06Q 50/184 |
| 2021/0043049 | A1 * | 2/2021 | Moura | G06T 7/70 |

OTHER PUBLICATIONS

Meijer, Experimental system for auditory image representations, IEEE, vol. 39, pp. 112-121 (Year: 1992).*

The Voice-Seeing with sound, Cited as NPL in U.S. Appl. No. 11/030,678 (Year: 1996).*

"Human echolocation", Retrieved from: https://en.wikipedia.org/wiki/Human_echolocation, Feb. 23, 2020, 10 Pages.

"International Search Report and Written Opinion Issued in PCT Application No. PCT/US2019/060184", dated Mar. 11, 2020, 32 Pages.

* cited by examiner

LOCATING SPATIALIZED SOUNDS NODES FOR ECHOLOCATION USING UNSUPERVISED MACHINE LEARNING

BACKGROUND

Echolocation allows an individual to perceive the individual's surroundings by emitting an acoustic sound and listening for reflection of sound waves produced by nearby objects. Echolocation can be utilized by visually impaired individuals to navigate.

SUMMARY

Described herein is a system for generating echolocation sounds to assist a user in navigating a three-dimensional space, comprising: a processing system comprising a processor and a memory having computer-executable instructions stored thereupon which, when executed by the processor, cause the processing system to: receive input from a user to generate echolocation sounds to navigate a three-dimensional space; based at least on the received input: segment a digital representation of the three-dimensional space into one or more depth planes using an unsupervised machine learning algorithm; for each depth plane, determine object segments for each object within the particular depth plane; determine locations of a plurality of echo sound nodes in accordance with the depth level and surface area of each object defined by the determined segments; and generate the echolocation sounds comprising a spatialized sound from each echo sound node originating from the determined location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
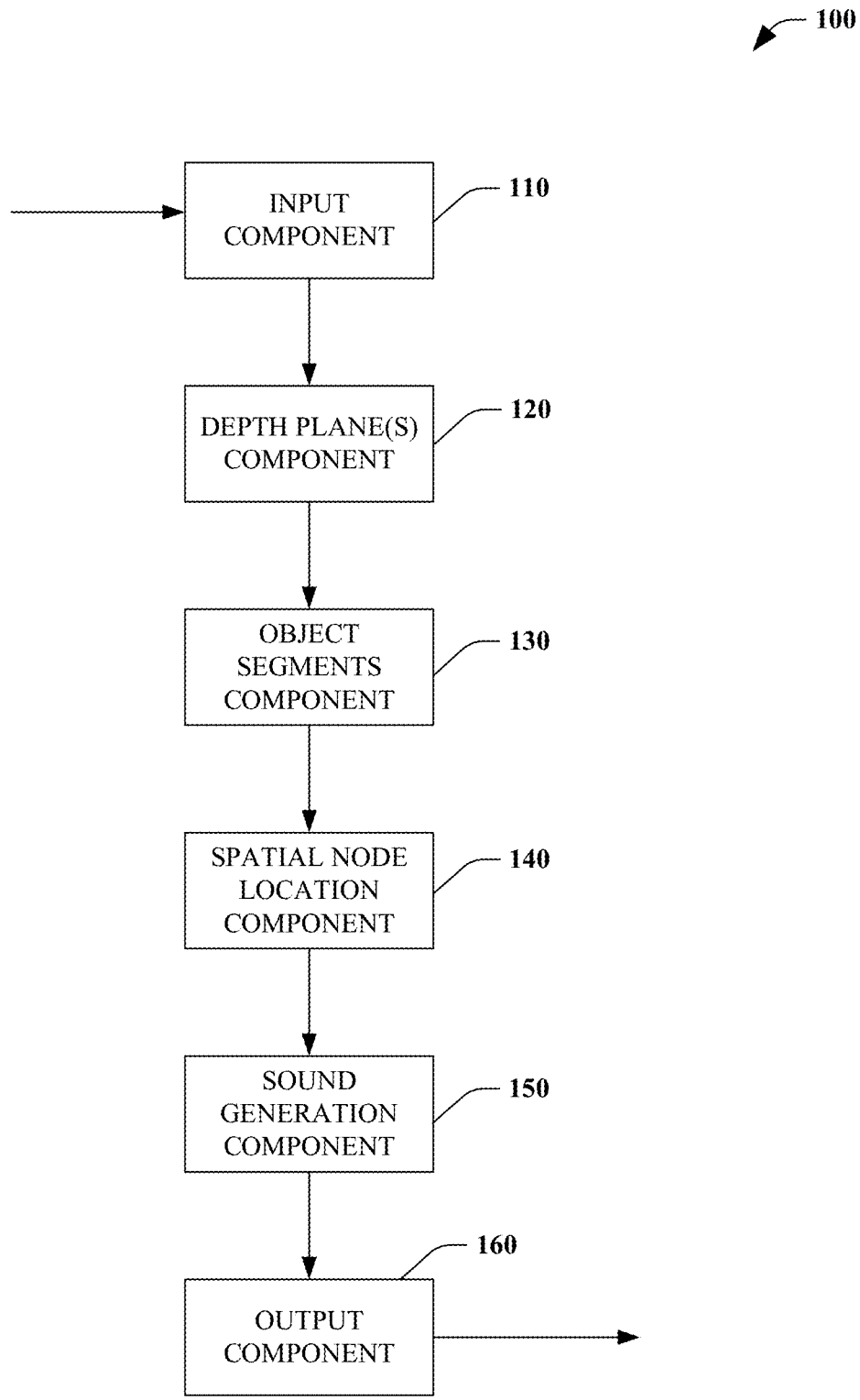
FIG. 1 is a functional block diagram that illustrates a system for generating echolocation sounds to assist a user in navigating a three-dimensional space.

Various technologies pertaining to generating echolocation sounds to assist a user in navigating a three-dimensional space are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding generating echolocation sounds to assist a user in navigating a three-dimensional space. What follows are one or more exemplary systems and methods.

Aspects of the subject disclosure pertain to the technical problem of assisting a user (e.g., having no sight or limited sight) to navigate a three-dimensional space (e.g., physical environment, computer gaming experience, and/or virtual reality experience). The technical features associated with addressing this problem involve receiving input from the user to generate echolocation sounds to navigate a three-dimensional space; based at least on (e.g., in response to) the received input: segmenting a digital representation of the three-dimensional space into one or more depth planes using an unsupervised machine learning algorithm; for each depth plane, determining object segments for each object within the particular depth plane; determining locations of a plurality of echo sound nodes in accordance with the depth level and surface area of each object defined by the determined segments; and generating the echolocation sounds comprising a spatialized sound from each echo sound node originating from the determined location. Accordingly, aspects of these technical features exhibit technical effects of more efficiently and effectively assisting a user having no sight or limited sight to navigate a three-dimensional space using computer-generated echolocation sounds.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Individual(s) with no sight or low sight can have difficulty navigating the physical world and/or a virtual world, for example, associated with a gaming experience. Echolocation allows an individual with no or low sight to perceive the individual's surroundings in response to an emitted acoustic sound and by listening for reflection of sound waves produced by nearby objects.

Described herein is a system and method of generating echolocation sounds to assist a user in navigating a three-dimensional space (e.g., a physical space and/or a virtual environment). In response to a user input (e.g., request) to generate echolocation sounds to navigate the three-dimensional space, a representation associated with the three-dimensional space (e.g., computer image) is segmented into depth levels (e.g., planes) (from the perspective of the user) using an unsupervised machine learning algorithm (e.g., clustering algorithm). For each depth level, object segments are determined for each object within the particular depth level. Locations of a plurality of echo sound nodes (e.g., predetermined quantity and/or dynamically determined based upon the three-dimensional space) are determined in accordance with the depth level and surface area of each object defined by the determined segments. The echolocation sounds comprising a spatialized sound from each echo sound node originating from the determined location are generated. For example, the spatialized sounds associated with closer and/or larger objects can be louder relative to those associated with further and/or smaller objects.

In some embodiments, the system and method can provide accessibility features that can be incorporated with three-dimensional game(s) to allow a greater cross-section of players (e.g., limited sight user(s) and/or non-sighted user(s)) to participate. Spatial audio cues provided by the system and method can allow the user to navigate the three-dimensional game. For example, using unsupervised machine learning, the system and method can determine the best/optimal location and sound for each echo sound node in order to assist the user to navigate a three-dimensional space.

Referring to FIG. 1, a system for generating echolocation sounds to assist a user in navigating a three-dimensional space 100 is illustrated. The system 100 can assist individual(s) with no sight or low sight to navigate the physical world and/or a virtual world (e.g., a gaming experience) by locating echo sound nodes and generating echolocation sounds from the echo sound nodes.

The system 100 includes an input component 110 that receives an input from a user to generate echolocation sounds to assist in navigation of a three-dimensional space. In some embodiments, the input can be received via an input device (e.g., pointing device such as a mouse, trackball, stylus, touch pad, keyboard, microphone, joystick, game pad, satellite dish, scanner, camera, other computer, etc.). In some embodiments, the input can be received via button or touch-sensitive input, for example, of a virtual reality/augmented reality headset. In some embodiments, the input can be a voice command received via a microphone. In some embodiments, the input can be inferred based upon gesture(s) and/or movement(s) of the user.

In some embodiments, the input can be based upon a gesture, for example, from various touch (e.g., touch screen(s)) and/or motion-sensitive systems (e.g., virtual reality visualization/manipulation systems). In some embodiments, the input component 110 can receive a gesture from a gesture-sensitive display which can be an integrated system having a display and sensors and/or from a disparate display and sensors (not shown). In some embodiments, the input component 110 can receive a gesture via a virtual reality visualization/manipulation system (not shown) or an augmented reality visualization/manipulation system (not shown). The virtual reality visualization/manipulation system and/or the augmented reality visualization/manipulation system can include accelerometers/gyroscopes, 3D displays, head tracking, eye tracking, gaze tracking and/or immersive augmented reality systems.

In some embodiments, the three-dimensional space comprises a computer-generated gaming experience. For example, the three-dimensional space can be displayed via computer displays (e.g., LCD, LED, plasma), a virtual reality headset, and/or an augmented reality headset. In some embodiments, the three-dimensional space is not displayed to the user (as the user has no or limited sight) with the user navigating the three-dimensional space using the echolocation sounds generated by the system 100. In some embodiments, the three-dimensional space comprises a virtual reality, a mixed-reality, and/or augmented reality environment.

In some embodiments, the three-dimensional space comprises a physical environment. For example, a digital representation of the three-dimensional space can be captured using a digital camera, a three-dimensional camera, and/or a depth camera. For example, the representation can be generated based on depth image(s) from a depth sensing camera.

The system 100 further includes a depth plane(s) component 120 that, in response to the received input, segments a digital representation of the three-dimensional space into one or more depth plane(s) using an unsupervised machine learning algorithm. In some embodiments, the digital representation of the three-dimensional space is based upon a current position (e.g., stationary) of the user. In some embodiments, the digital representation of the three-dimensional space is based upon a predicted or inferred position of the user (e.g., based upon direction and velocity of user moving in physical environment and/or computer-generated virtual environment).

In some embodiments, when the three-dimensional space comprises a computer-generated gaming experience, the digital representation can be a view of the gaming experience in accordance with a perspective of the user (e.g., directional or in direction of travel). In some embodiments, when the three-dimensional space comprises a virtual reality, a mixed-reality, and/or an augmented reality environment, the digital representation can be a view of the virtual reality, the mixed-reality, and/or the augmented reality environment in accordance with the perspective of the user (e.g., directional or in direction of travel). In some embodiments, when the three-dimensional space comprises a physical environment, the digital representation can be a view of the physical environment (e.g., image and/or three-dimensional image) taken from the perspective of the user (e.g., directional view or view in direction of travel).

In some embodiments, segmentation of the digital representation of the three-dimensional space into depth planes can be performed based upon a predefined quantity of planes and associated distances, for example, three planes of (1) zero to five feet, (2) greater than five feet to ten feet; and, (3) greater than ten feet. In some embodiments, segmentation of the digital representation of the three-dimensional space into depth planes can be performed using a clustering algorithm to identify a suitable quantity of clusters (e.g., depth planes). In some embodiments, the clustering algorithm comprises a k-means clustering algorithm (e.g., where k equals the number of data clusters) employing the elbow method which reviews the percentage of variance as a function of the number of clusters. For example, the number of clusters (k) can be chosen at a point where the marginal gain from additional number of clusters drops (e.g., below a threshold amount). In this manner, an optimal quantity of clusters can be determined in which adding additional cluster(s) would not significantly benefit modeling of the data.

Figure 2:
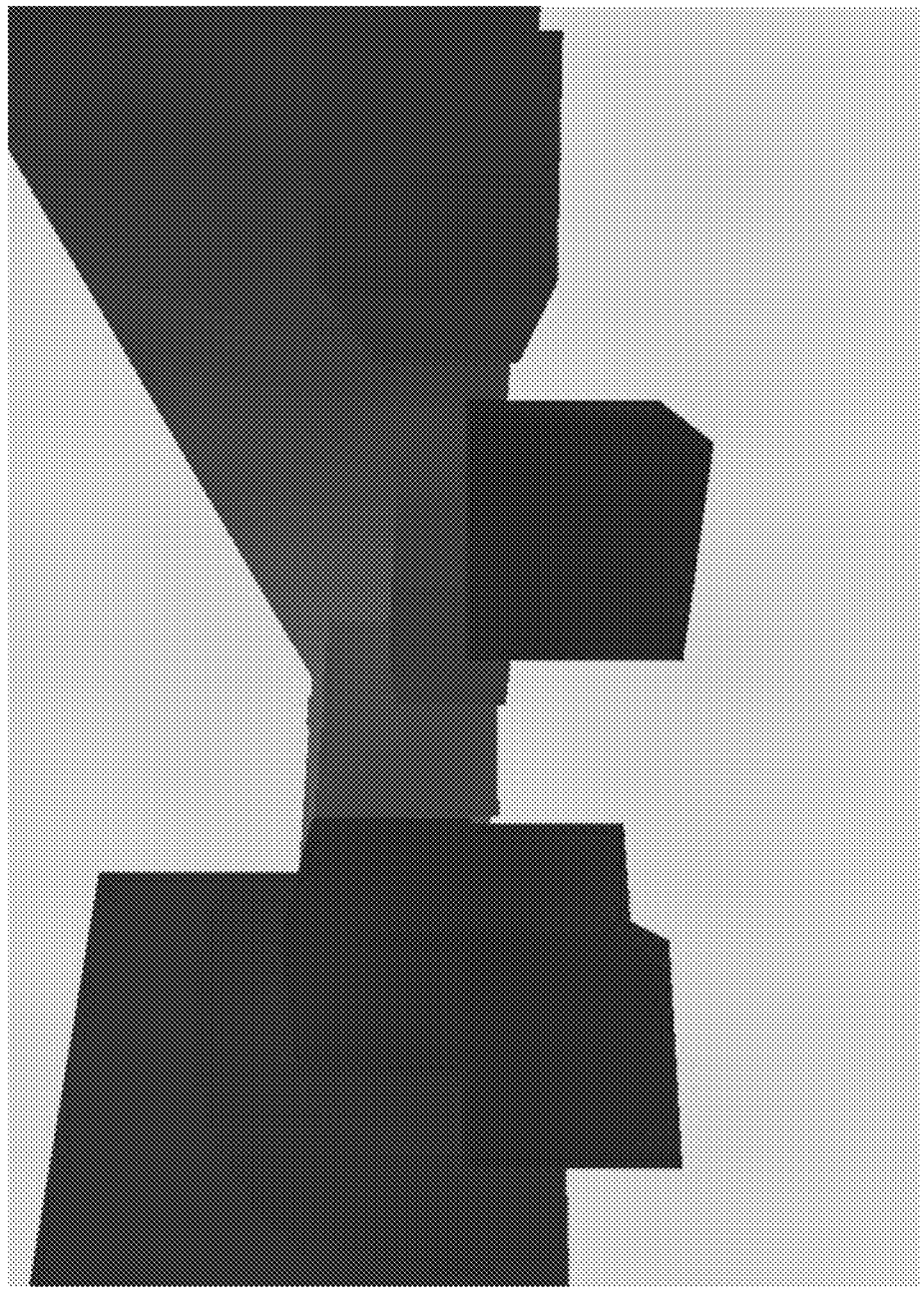
FIG. 2 is a diagram that illustrates exemplary initial depth levels.
Figure 3:
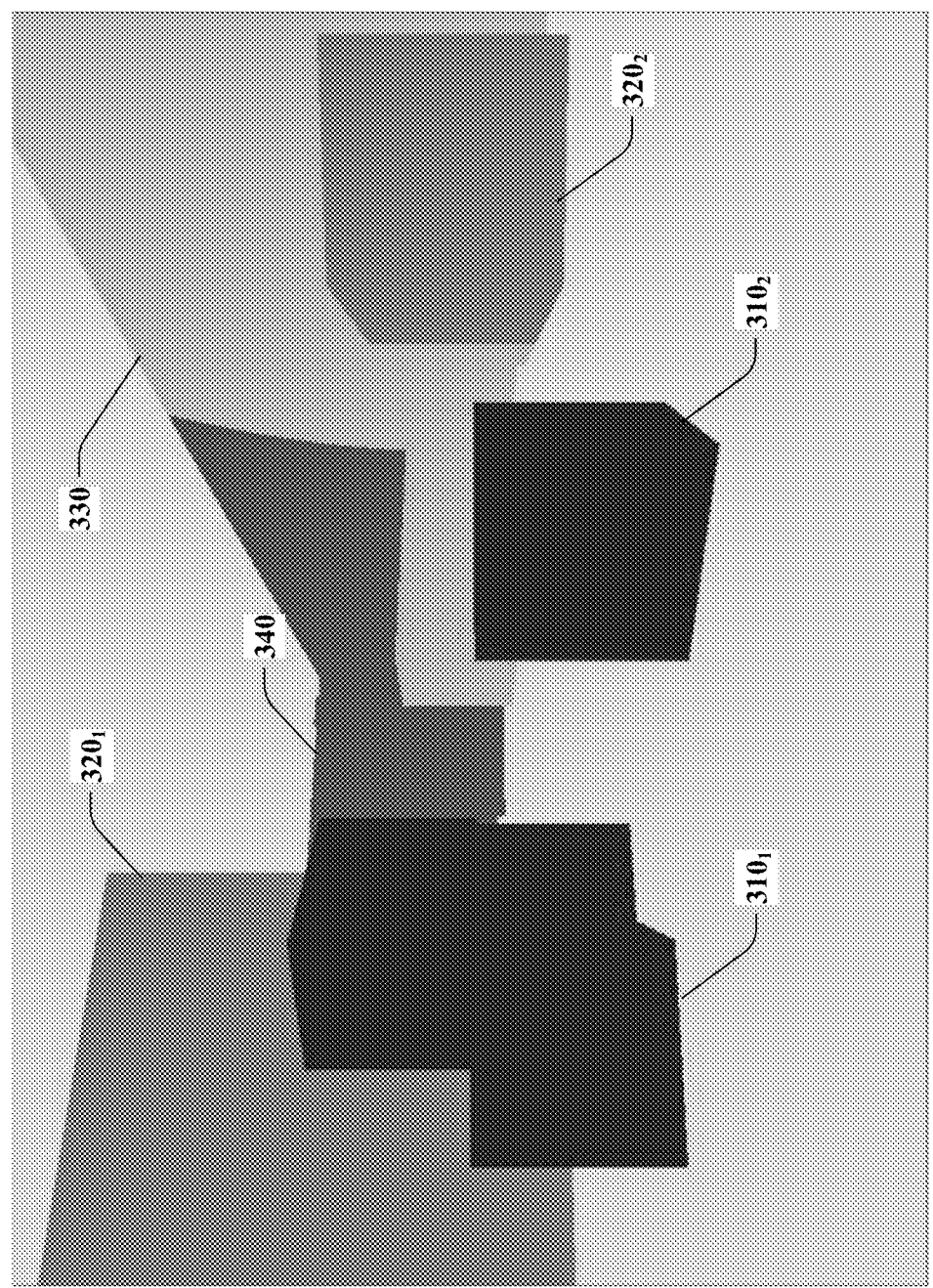
FIG. 3 is a diagram that illustrates exemplary depth levels and segmented objects.

Once the representation of the three-dimensional space has been segmented into depth plane(s), an object segments component 130 can, for each depth level, determine object segments for object(s) within the particular depth level. In some embodiments, the object segments component 130 can utilize an unsupervised machine learning algorithm to determine the object segments. These determined segments can define a surface area of a particular object at the particular depth level. Referring to FIG. 2, a diagram 200 illustrating exemplary initial depth levels is illustrated. Turning to FIG. 3, a diagram 300 illustrating exemplary depth levels and segmented objects of the diagram 200 of FIG. 2. The diagram 300 includes four depth levels 310, 320, 330, and 340.

Referring back to FIG. 1, next, a spatial node location component 140 determines locations for each of a plurality of echo sound nodes in accordance with the depth level and surface area of objects defined by the determined segments. In some embodiments, the quantity of echo sound nodes is predefined (e.g., thirty). In some embodiments, the quantity of echo sound nodes is determined dynamically based upon the surface area of the objects and their associated depth levels. In some embodiments, the quantity of echo sound nodes does not exceed a predetermined maximum quantity (e.g., thirty). In some embodiments, the quantity of echo sounds nodes is greater than or equal a predetermined minimum quantity (e.g., three).

Figure 4:
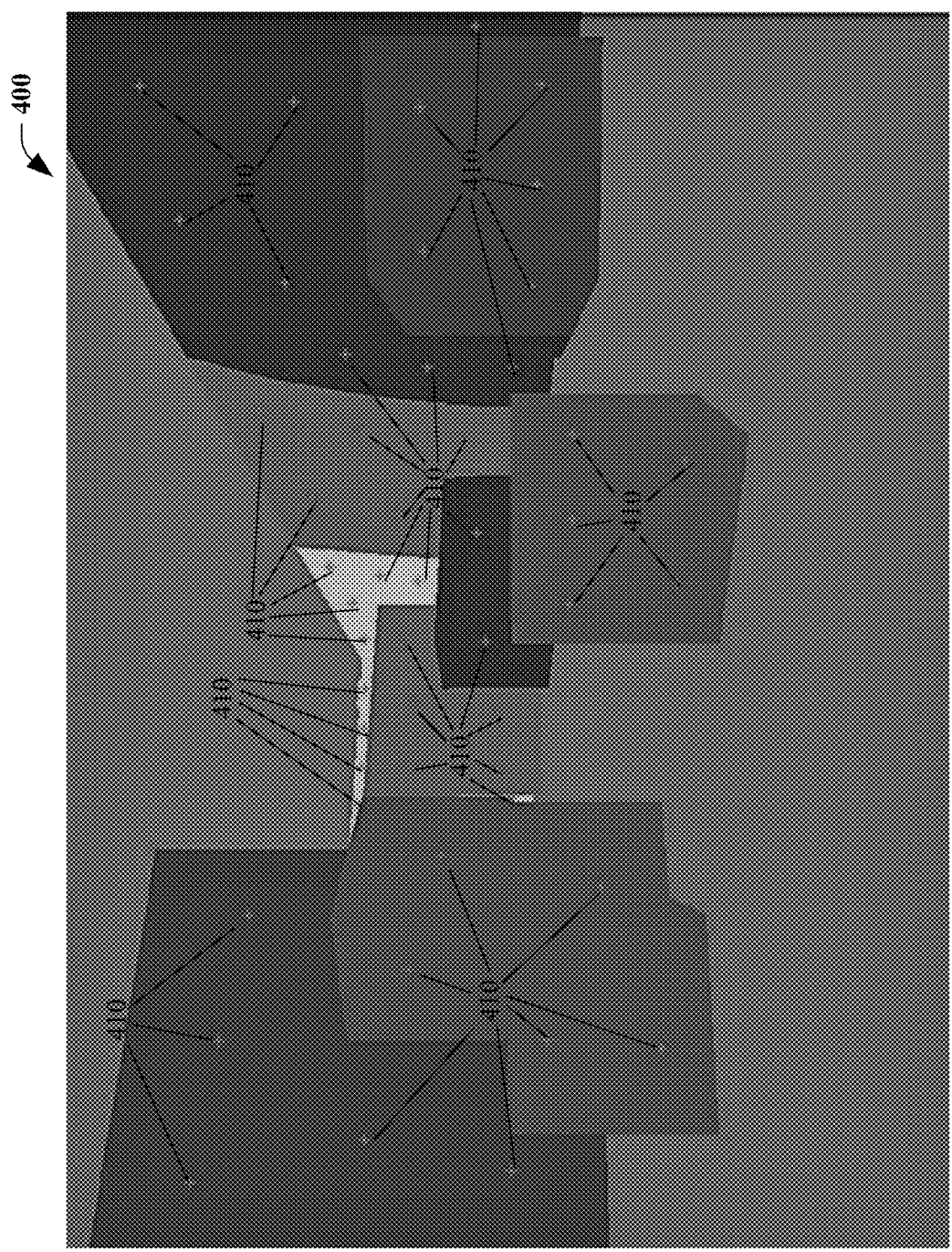
FIG. 4 is a diagram that illustrates exemplary echo sound nodes located on object.

In some embodiments, the echo sound nodes can be placed in decreasing order of depth and proportional to a size and shape a particular object (e.g., based upon the surface area of the particular object as defined the determined object segments). Referring briefly to FIG. 4, a diagram 400 illustrates exemplary echo sound nodes 410 located on objects of FIGS. 2 and 3.

In some embodiments, a first sound generated by a first echo sound node may be output with a high volume and short delay to indicate that the object is proximate to the user. A second sound generated by a second echo sound node may be output with a lower volume and a longer delay than the first sound to indicate that the second object is further away from the user than the first object.

The system 100 includes a sound generation component 150 that generates echolocation sounds each comprising a spatialized sound originating from the particular echo sound node at the determined location. The system 100 includes an output component 160 that provides the generated echolocation sounds to the user. In some embodiments, the echolocation sounds are provided through computer speaker(s), a headset (e.g., stereo, virtual reality, augmented reality, mixed reality), and/or room speaker(s).

In some embodiments, the generated echolocation sounds can be provided using a channel-based audio output (e.g., utilizing a Dolby 5.1 surround sound system), a spherical sound representation (e.g., Ambisonics, higher-order Ambisonics) and/or an object-based audio output.

In some embodiments, the generated echolocation sounds can be provided to the user via a head mounted device configured to modify an audio signal based on a head related transfer function (HRTF) to produce the spatialized audio signal corresponding to echolocation sounds. The HRTF modifies the audio signal to account for changes in volume and directionality of the audio signal based on the simulated position from which the audio signal originates (e.g., echo sound node(s)).

Figure 5:
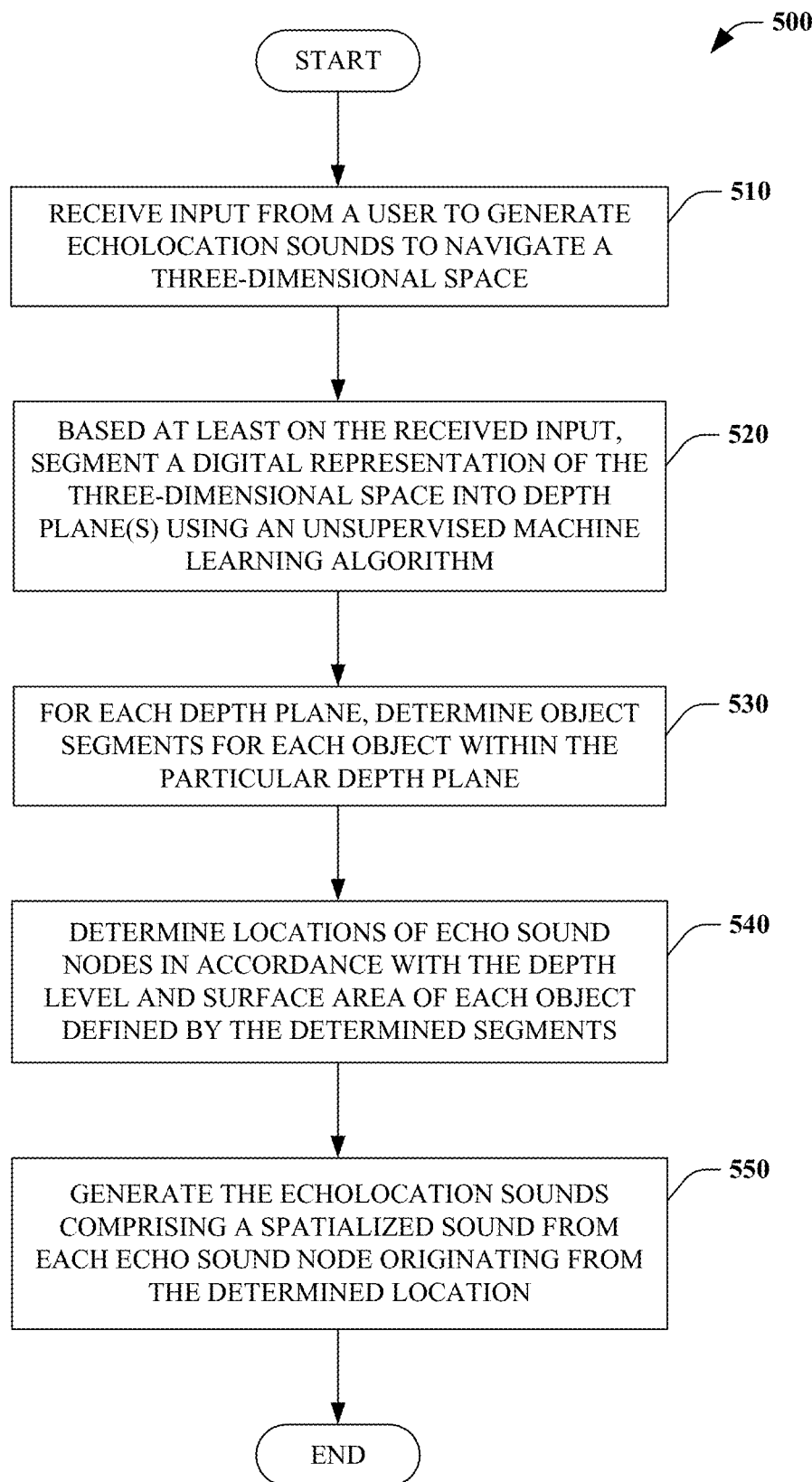
FIG. 5 is a flow chart that illustrates a method of generating echolocation sounds to assist a user in navigating a three-dimensional space.
Figure 6:
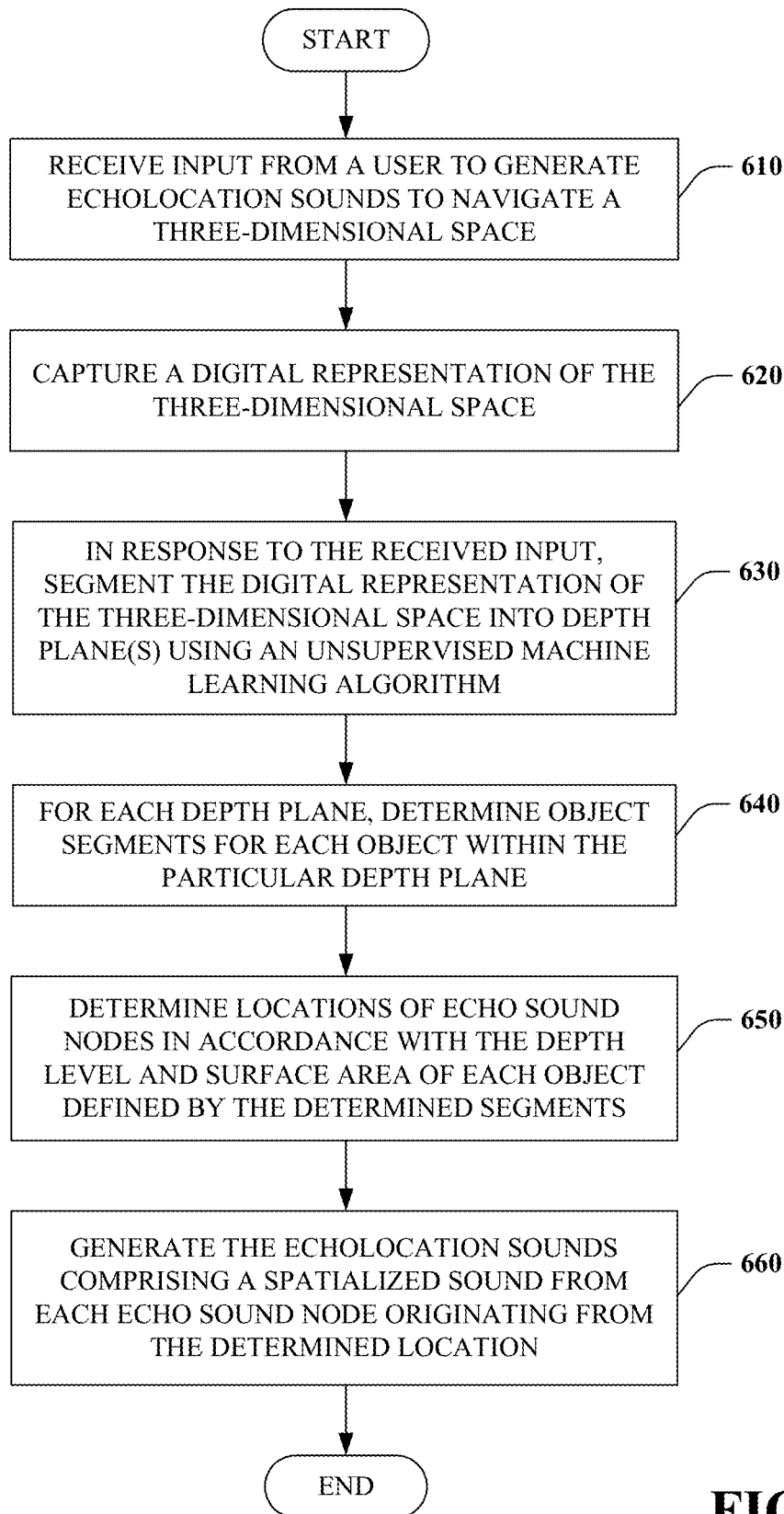
FIG. 6 is a flow chart that illustrates a method of generating echolocation sounds to assist a user in navigating a three-dimensional space.

FIGS. 5 and 6 illustrate exemplary methodologies relating to generating echolocation sounds to assist a user in navigating a three-dimensional space. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 5, a method of generating echolocation sounds to assist a user in navigating a three-dimensional space 500 is illustrated. In some embodiments, the method 500 is performed by the system 100.

At 510, input is received from a user to generate echolocation sounds to navigate a three-dimensional space. At 520, based at least on (e.g., in response to) the received input, a digital representation of the three-dimensional space is segmented into one or more depth planes (e.g., from a perspective of the user) using an unsupervised machine learning algorithm.

At 530, for each depth plane, object segments are determined for each object within the particular depth plane. At 540, locations of a plurality of echo sound nodes are determined in accordance with the depth level and surface area of each object defined by the determined segments.

At 550, the echolocation sounds are generated comprising a spatialized sound from each echo sound node originating from the determined location. In some embodiments, the generated echolocation sounds can be provided using a channel-based audio output (e.g., utilizing a Dolby 5.1 surround sound system), a spherical sound representation (e.g., Ambisonics, higher-order Ambisonics) and/or an object-based audio output.

Turning to FIG. 6, a method of generating echolocation sounds to assist a user in navigating a three-dimensional space 600 is illustrated. In some embodiments, the method 600 is performed by the system 100.

At 610, input is received from a user to generate echolocation sounds to navigate a three-dimensional space. At 620, a digital representation of the three-dimensional space is captured. For example, a digital representation of the three-dimensional space can be captured using a digital camera, a three-dimensional camera, and/or a depth camera.

At 630, in response to the received input, the digital representation of the three-dimensional space is segmented into one or more depth planes (e.g., from a perspective of the user) using an unsupervised machine learning algorithm.

At 640, for each depth plane, object segments are determined for each object within the particular depth plane. At 650, locations of a plurality of echo sound nodes are determined in accordance with the depth level and surface area of each object defined by the determined segments.

At 660, the echolocation sounds are generated comprising a spatialized sound from each echo sound node originating from the determined location. In some embodiments, the generated echolocation sounds can be provided using a channel-based audio output (e.g., utilizing a Dolby 5.1 surround sound system), a spherical sound representation (e.g., Ambisonics, higher-order Ambisonics) and/or an object-based audio output.

Described herein is a system for generating echolocation sounds to assist a user in navigating a three-dimensional space, comprising: a processing system comprising one or more processors and a memory having computer-executable instructions stored thereupon which, when executed by the one or more processors, cause the processing system to: receive input from a user to generate echolocation sounds to navigate a three-dimensional space; based at least on the received input: segment a digital representation of the three-dimensional space into one or more depth planes using an unsupervised machine learning algorithm; for each depth plane, determine object segments for each object within the particular depth plane; determine locations of a plurality of echo sound nodes in accordance with the depth level and surface area of each object defined by the determined segments; and generate the echolocation sounds comprising a spatialized sound from each echo sound node originating from the determined location.

The system can further include wherein the unsupervised machine learning algorithm comprises a clustering algorithm, with each cluster identified by the clustering algorithm comprising a depth level.

The system can include the memory having further computer-executable instructions stored thereupon which, when executed by the one or more processors, cause the processing system to: capture the digital representation of the three-dimensional space. The system can further include wherein the digital representation of the three-dimensional space is captured using at least one of a digital camera, a three-dimensional camera, or a depth camera. The system can further include wherein the echolocation sounds are generated by at least one of a virtual reality headset, a mixed-reality headset, or an augmented reality headset. The system can further include wherein the echolocation sounds are generated using at least one of a channel-based audio output, a spherical sound representation, or an object-based audio output.

The system can further include wherein the input is inferred based upon at least one of a gesture or a movement of the user. The system can further include wherein the input is based upon a gesture of the user. The system can further include wherein the three-dimensional space comprises a computer-generated gaming experience. The system can further include wherein the three-dimensional space comprises a physical environment.

Described herein is a method of generating echolocation sounds to assist a user in navigating a three-dimensional space, comprising: receiving input from the user to generate echolocation sounds to navigate the three-dimensional space; based at least on the received input: segmenting a digital representation of the three-dimensional space into one or more depth planes using an unsupervised machine learning algorithm; for each depth plane, determining object segments for each object within the particular depth plane; determining locations of a plurality of echo sound nodes in accordance with the depth level and surface area of each object defined by the determined segments; and generating the echolocation sounds comprising a spatialized sound from each echo sound node originating from the determined location.

The method can further include wherein the unsupervised machine learning algorithm comprises a k-means clustering algorithm employing an elbow method which reviews a percentage of variance as a function of a number of clusters to determine a quantity of clusters. The method can further include capturing the digital representation of the three-dimensional space using at least one of a digital camera, a three-dimensional camera, or a depth camera.

The method can further include wherein the echolocation sounds are generated by at least one of a virtual reality headset, a mixed-reality headset, or an augmented reality headset. The method can further include wherein the echolocation sounds are generated using at least one of a channel-based audio output, a spherical sound representation, or an object-based audio output. The method can further include wherein the three-dimensional space comprises a computer-generated gaming experience.

Described herein is a computer storage media storing computer-readable instructions that when executed cause a computing device to: receive input from a user to generate echolocation sounds to navigate a three-dimensional space; based at least on the received input: segment a digital representation of the three-dimensional space into one or more depth planes using an unsupervised machine learning algorithm; for each depth plane, determine object segments for each object within the particular depth plane; determine locations of a plurality of echo sound nodes in accordance with the depth level and surface area of each object defined by the determined segments; and generate the echolocation sounds comprising a spatialized sound from each echo sound node originating from the determined location.

The computer storage media can further include wherein the unsupervised machine learning algorithm comprises a clustering algorithm, with each cluster identified by the clustering algorithm comprising a depth level. The computer storage media can further include wherein the echolocation sounds are generated by at least one of a virtual reality headset, a mixed-reality headset, or an augmented reality headset, and, wherein the echolocation sounds are generated using at least one of a channel-based audio output, a spherical sound representation, or an object-based audio output. The computer storage media can further include wherein the three-dimensional space comprises a computer-generated gaming experience.

Figure 7:
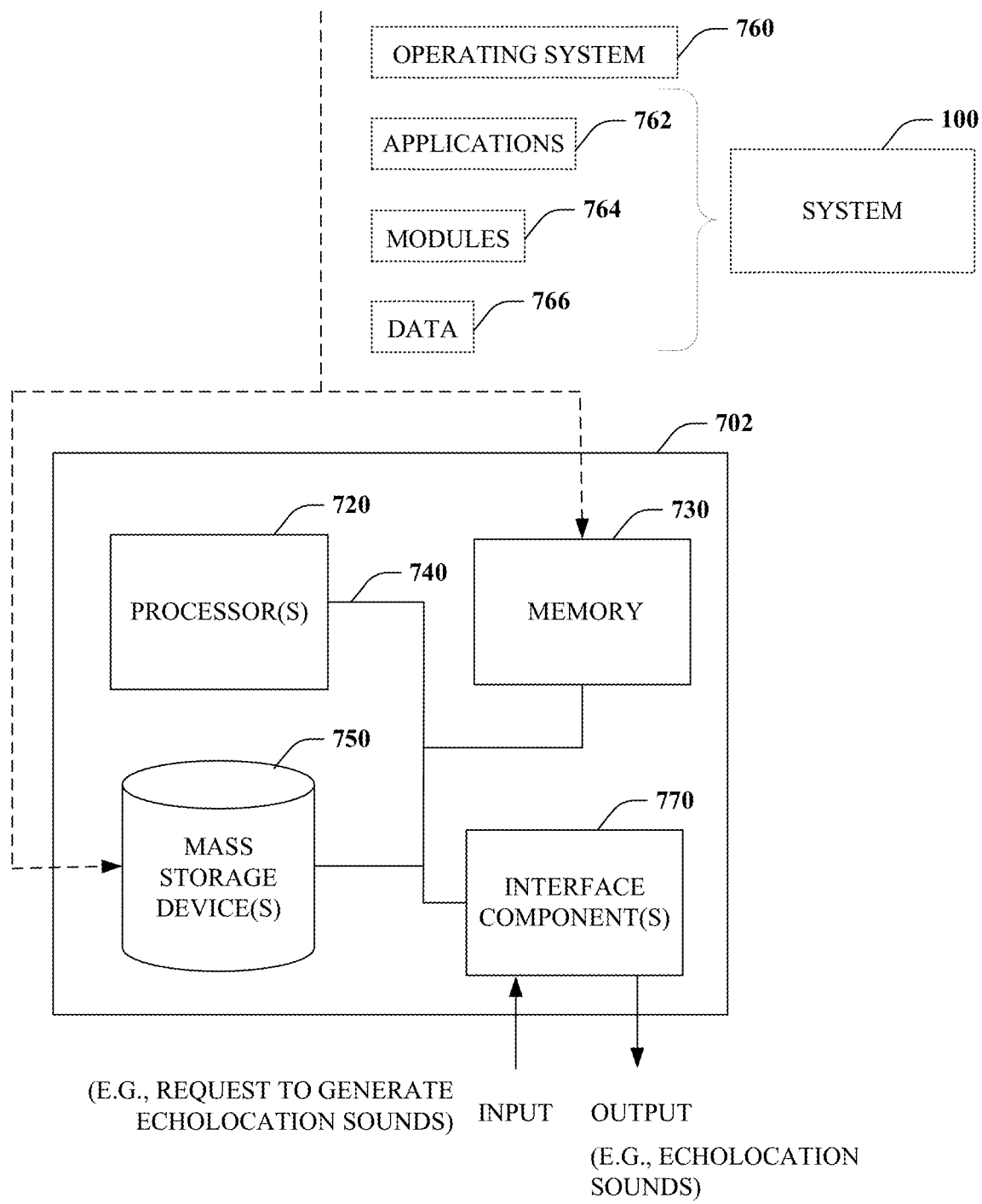
FIG. 7 is a functional block diagram that illustrates an exemplary computing system.

With reference to FIG. 7, illustrated is an example general-purpose processing system, computer, or computing device 702 (e.g., mobile phone, desktop, laptop, tablet, watch, server, hand-held, programmable consumer or industrial electronics, set-top box, game system, compute node, etc.). For instance, the computing device 702 may be used in a system for generating echolocation sounds to assist a user in navigating a three-dimensional space 100.

The computer 702 includes one or more processor(s) 720, memory 730, system bus 740, mass storage device(s) 750, and one or more interface components 770. The system bus 740 communicatively couples at least the above system constituents. However, it is to be appreciated that in its simplest form the computer 702 can include one or more processors 720 coupled to memory 730 that execute various computer executable actions, instructions, and or components stored in memory 730. The instructions may be, for instance, instructions for implementing functionality described as being carried out by one or more components discussed above or instructions for implementing one or more of the methods described above.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 720 can be a graphics processor.

The computer 702 can include or otherwise interact with a variety of computer-readable media to facilitate control of the computer 702 to implement one or more aspects of the claimed subject matter. The computer-readable media can be any available media that can be accessed by the computer 702 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 730 and mass storage device(s) 750 are examples of computer-readable storage media. Depending on the exact configuration and type of computing device, memory 730 may be volatile (e.g., RAM), non-volatile (e.g., ROM, flash memory, etc.) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage device(s) 750 includes removable/non-removable, volatile/non-volatile computer storage media for storage of large amounts of data relative to the memory 730. For example, mass storage device(s) 750 includes, but is not limited to, one or more devices such as a magnetic or optical disk drive, floppy disk drive, flash memory, solid-state drive, or memory stick.

Memory 730 and mass storage device(s) 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage device (s) 750 to perform one or more actions. Accordingly, applications 762 can turn a general-purpose computer 702 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 762, and include one or more modules 764 and data 766 stored in memory and/or mass storage device (s) 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g., serial, parallel, PCMCIA, USB, FireWire, etc.) or an interface card (e.g., sound, video, etc.) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 770 can be embodied as an output peripheral interface to supply output to displays (e.g., LCD, LED, plasma, etc.), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
one or more processors; and
a memory having computer-executable instructions stored thereupon which, when executed by the one or more processors, cause the system to:
segment a digital representation of a three-dimensional space into two or more depth planes using an unsupervised machine learning algorithm;
determine object segments for respective objects within respective depth planes;
determine respective surface areas of the respective objects;
based at least on the respective surface areas determined for the respective objects and the respective depth planes of the respective objects, select a first plurality of discrete locations in the three-dimensional space for placement of a first plurality of echo sound nodes on a first object in a first depth plane and a second plurality of discrete locations in the three-dimensional space for placement of a second plurality of echo sound nodes on a second object in a second depth plane, wherein at least some other locations in the three-dimensional space are not selected to receive echo sound nodes;
place the first plurality of echo sound nodes at the first plurality of discrete locations on the first object and the second plurality of echo sound nodes at the second plurality of discrete locations on the second object; and
generate a plurality of spatialized echolocation sounds originating from the first plurality of echo sound nodes and the second plurality of echo sound nodes.

2. The system of claim 1, wherein the unsupervised machine learning algorithm comprises a clustering algorithm, with each cluster identified by the clustering algorithm comprising a different depth level.

3. The system of claim 1, the memory having further computer-executable instructions stored thereupon which, when executed by the one or more processors, cause the system to:
capture the digital representation of the three-dimensional space.

4. The system of claim 3, wherein the digital representation of the three-dimensional space is captured using at least one of a digital camera, a three-dimensional camera, or a depth camera.

5. The system of claim 1, wherein the plurality of spatialized echolocation sounds are generated by at least one of a virtual reality headset, a mixed-reality headset, or an augmented reality headset.

6. The system of claim 1, wherein the plurality of spatialized echolocation sounds are generated using at least one of a channel-based audio output, a spherical sound representation, or an object-based audio output.

7. The system of claim 1, the memory having further computer-executable instructions stored thereupon which, when executed by the one or more processors, cause the system to:
based upon a movement of a user, infer an input requesting to generate the plurality of spatialized echolocation sounds; and
generate the plurality of spatialized echolocation sounds responsive to inferring the input.

8. The system of claim 1, the memory having further computer-executable instructions stored thereupon which, when executed by the one or more processors, cause the system to:
detect a gesture of a user; and
generate the plurality of spatialized echolocation sounds responsive to detecting the gesture.

9. The system of claim 1, wherein the three-dimensional space comprises a computer-generated gaming experience.

10. The system of claim 1, wherein the three-dimensional space comprises a physical environment.

11. A method, comprising:
receiving input from a user to generate echolocation sounds to navigate a three-dimensional space; and
responsive to the received input:
segmenting a digital representation of the three-dimensional space into two or more depth planes using an unsupervised machine learning algorithm;
determining object segments for respective objects within respective depth planes;
determining respective surface areas of the respective objects;
based at least on the respective surface areas determined for the respective objects and the respective depth planes of the respective objects, selecting a first plurality of discrete locations in the three-dimensional space for placement of a first plurality of echo sound nodes on a first object in a first depth plane and a second plurality of discrete locations in the three-dimensional space for placement of a second plurality of echo sound nodes on a second object in a second depth plane;
placing the first plurality of echo sound nodes at the first plurality of discrete locations on the first object and the second plurality of echo sound nodes at the second plurality of discrete locations on the second object, wherein at least some other discrete locations on the first object and the second object do not receive echo sound nodes; and
generating a plurality of echolocation sounds originating from the first plurality of echo sound nodes and the second plurality of echo sound nodes.

12. The method of claim 11, wherein the unsupervised machine learning algorithm comprises a k-means clustering algorithm employing an elbow method which reviews a percentage of variance as a function of a number of clusters to determine a quantity of clusters.

13. The method of claim 11, further comprising:
capturing the digital representation of the three-dimensional space using at least one of a digital camera, a three-dimensional camera, or a depth camera.

14. The method of claim 11, wherein the plurality of echolocation sounds are generated by at least one of a virtual reality headset, a mixed-reality headset, or an augmented reality headset.

15. The method of claim 11, wherein the plurality of echolocation sounds are generated using at least one of a channel-based audio output, a spherical sound representation, or an object-based audio output.

16. The method of claim 11,
wherein the first plurality comprises a greater number of echo sound nodes than the second plurality, and wherein the first depth plane of the first object is relatively closer to the user than the second depth plane of the second object.

17. The method of claim 16, wherein generating the plurality of echolocation sounds comprises employing different volume and delay for first sounds originating from the first plurality of echo sound nodes than for second sounds originating from the second plurality of echo sound nodes.

18. A computer storage media storing computer-readable instructions that, when executed, cause a computing device to:
  segment a digital representation of a three-dimensional space into two or more depth planes using an unsupervised machine learning algorithm;
  determine object segments for respective objects within respective depth planes;
  determine respective surface areas of the respective objects;
  based at least on the respective surface areas determined for the respective objects and the respective depth planes of the respective objects, select a first plurality of discrete locations in the three-dimensional space for placement of a first plurality of echo sound nodes on a first object in a first depth plane and a second plurality of discrete locations in the three-dimensional space for placement of a second plurality of echo sound nodes on a second object in a second depth plane;
  place the first plurality of echo sound nodes at the first plurality of discrete locations on the first object and the second plurality of echo sound nodes at the second plurality of discrete locations on the second object, at least some other discrete locations on the first object and the second object lacking echo sound nodes; and
  generate a plurality of spatialized echolocation sounds originating from the first plurality of echo sound nodes and the second plurality of echo sound nodes.

19. The computer storage media of claim 18, wherein the unsupervised machine learning algorithm comprises a clustering algorithm, with each cluster identified by the clustering algorithm comprising a depth level.

20. The computer storage media of claim 19, wherein the plurality of spatialized echolocation sounds are generated by at least one of a virtual reality headset, a mixed-reality headset, or an augmented reality headset, and, wherein the plurality of spatialized echolocation sounds are generated using at least one of a channel-based audio output, a spherical sound representation, or an object-based audio output.

* * * * *